United States Patent
Dumont et al.

(10) Patent No.: US 11,428,355 B2
(45) Date of Patent: Aug. 30, 2022

(54) JUNCTION BODY, FITTINGS, HYDRAULIC SYSTEM FOR THE PASSAGE OF A FLUID BETWEEN TWO HYDRAULIC CIRCUITS, ASSOCIATED MOUNTING PROCESS

(71) Applicant: PERMASWAGE, Les Clayes sous bois (FR)

(72) Inventors: Mickaël Dumont, Bois d'Arcy (FR); Fabien Desnoël, Saulx Marchais (FR); Stéphane Heraud, Paris (FR)

(73) Assignee: PERMASWAGE, Les Clayes-sous-Bois (FR)

( * ) Notice: Subject to any disclaimer, the term of this patent is extended or adjusted under 35 U.S.C. 154(b) by 562 days.

(21) Appl. No.: 16/348,313

(22) PCT Filed: Nov. 8, 2017

(86) PCT No.: PCT/EP2017/078570
§ 371 (c)(1),
(2) Date: May 8, 2019

(87) PCT Pub. No.: WO2018/087127
PCT Pub. Date: May 17, 2018

(65) Prior Publication Data
US 2019/0264837 A1     Aug. 29, 2019

(30) Foreign Application Priority Data

Nov. 9, 2016   (FR) ...................................... 1660838

(51) Int. Cl.
*F16L 9/12*     (2006.01)
*F16L 13/14*     (2006.01)
(Continued)

(52) U.S. Cl.
CPC ............... *F16L 25/02* (2013.01); *F16L 9/125* (2013.01); *F16L 13/141* (2013.01); *F16L 25/01* (2013.01); *F16L 25/021* (2013.01); *F16L 25/025* (2013.01)

(58) Field of Classification Search
CPC ......... F16L 25/01; F16L 25/02; F16L 25/025; F16L 25/021
(Continued)

(56) References Cited

U.S. PATENT DOCUMENTS 3,891,291 A *   6/1975   Nadsady ................. F16L 25/01
4,258,942 A *   3/1981   Viola
(Continued)

FOREIGN PATENT DOCUMENTS

CN     206112338 U    4/2017
EP      2 672 156 A1    12/2013
(Continued)

OTHER PUBLICATIONS

International Search Report as issued in International Phase Application No. PCT/EP2017/078570, dated Jan. 31, 2018.

*Primary Examiner* — Zachary T Dragicevich
*Assistant Examiner* — William S. Choi
(74) *Attorney, Agent, or Firm* — Pillsbury Winthrop Shaw Pittman LLP

(57) ABSTRACT

A central body for a hydraulic system for fluid, including a frame having a first tubular end for connecting an upstream hydraulic circuit including a first fitting, and a second tubular end for connecting a downstream hydraulic circuit including a second fitting, the central body including a passage passing through the frame in order to convey the fluid coming from the upstream hydraulic circuit to the downstream hydraulic circuit, the frame being produced from an electrically insulating material, the central body (Continued)

including a printed circuit having controlled electrical properties in order to conduct a part of the electrical charges flowing in the upstream hydraulic circuit and the downstream hydraulic circuit.

16 Claims, 3 Drawing Sheets

(51) Int. Cl.
    *F16L 25/01*     (2006.01)
    *F16L 25/02*     (2006.01)

(58) Field of Classification Search
    USPC .................................................... 285/47, 62
    See application file for complete search history.

(56) References Cited

U.S. PATENT DOCUMENTS

| | | | |
|---|---|---|---|
| 5,234,033 | A | 8/1993 | Stoll et al. |
| 5,452,948 | A | 9/1995 | Cooper et al. |
| 6,442,012 | B2 * | 8/2002 | Koike .................... F16L 25/01 |
| 8,947,846 | B2 | 2/2015 | Courpet et al. |
| 9,169,029 | B2 * | 10/2015 | Gaw ...................... F16L 25/025 |
| 2010/0001512 | A1 | 1/2010 | Breay et al. |
| 2012/0056416 | A1 * | 3/2012 | Briand .................... F16L 25/01 |
| 2013/0099490 | A1 * | 4/2013 | Kwon .................... F16L 25/01 |
| 2016/0215917 | A1 * | 7/2016 | Army, Jr. ................ F16L 25/01 |

FOREIGN PATENT DOCUMENTS

| | | |
|---|---|---|
| FR | 2 260 055 A | 8/1975 |
| FR | 2 947 609 A1 | 1/2011 |
| GB | 1 596 242 A | 8/1981 |
| JP | S63-285396 A | 11/1988 |
| JP | H11-294676 A | 10/1999 |
| JP | 2012-532300 A | 12/2012 |
| JP | 2013-257039 A | 12/2013 |
| WO | WO 96/28664 A1 | 9/1996 |
| WO | WO 2011/005606 A1 | 1/2011 |

* cited by examiner

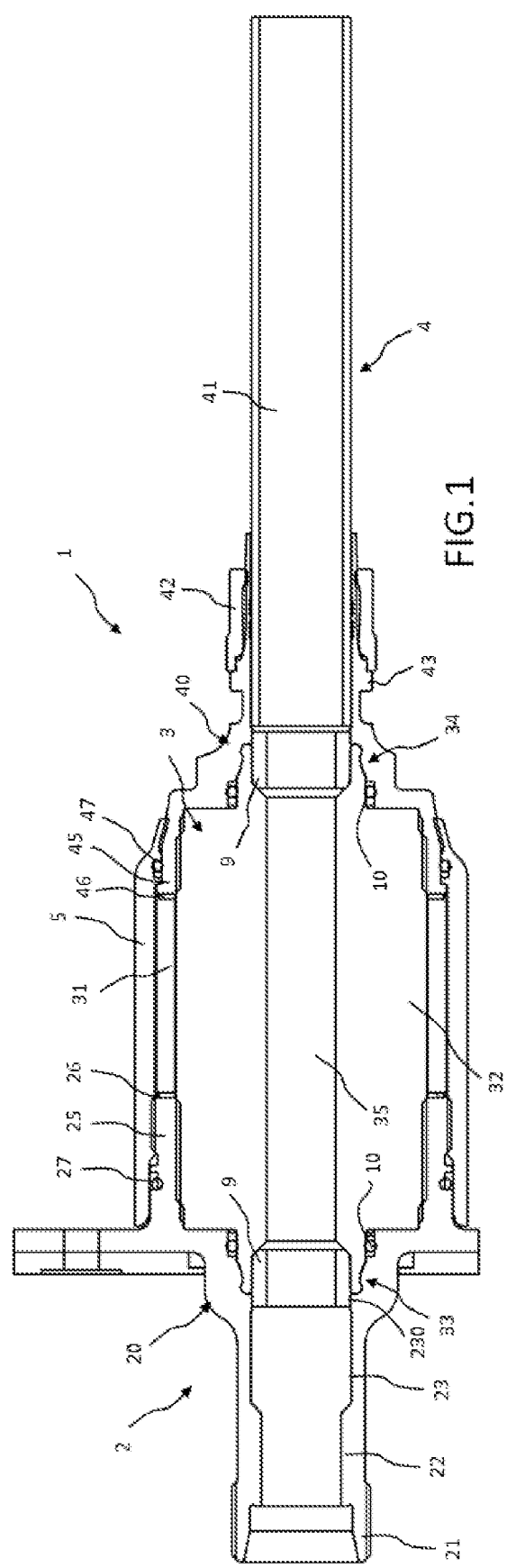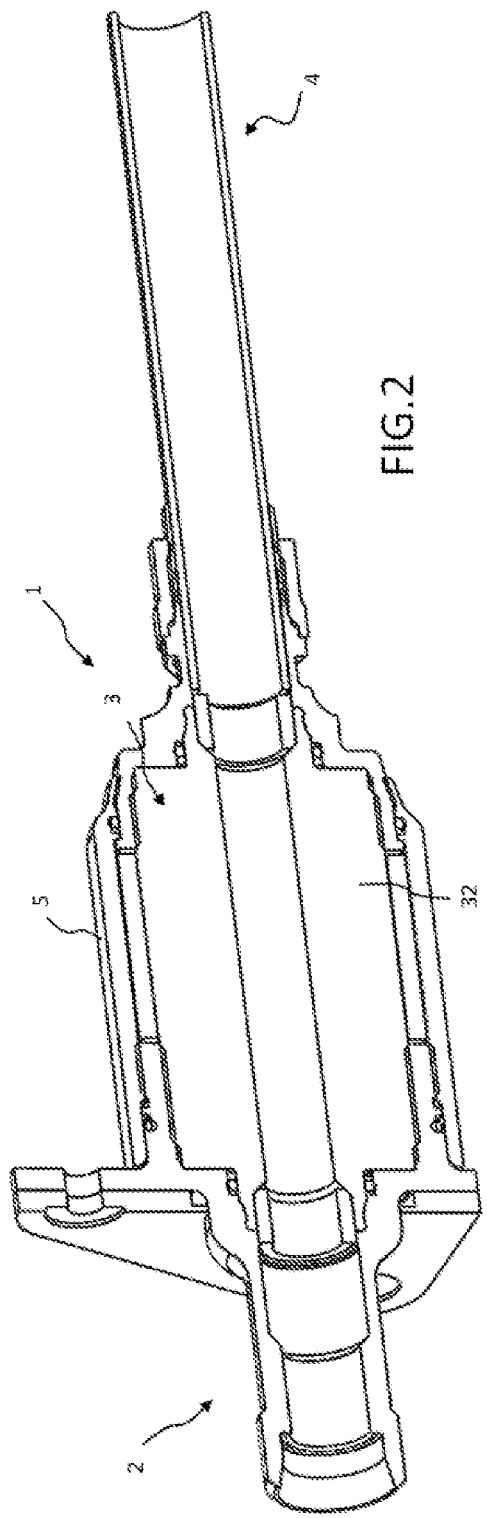

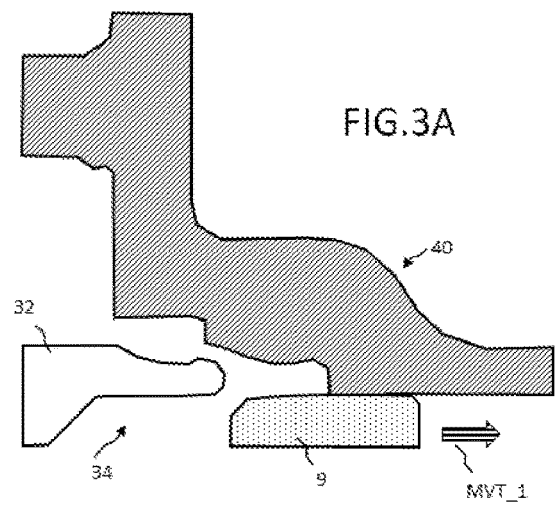
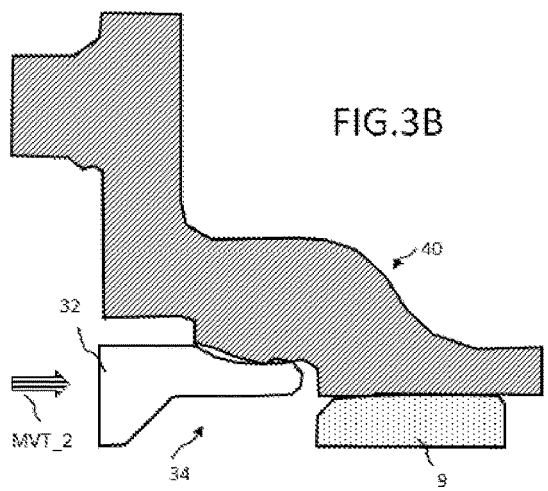
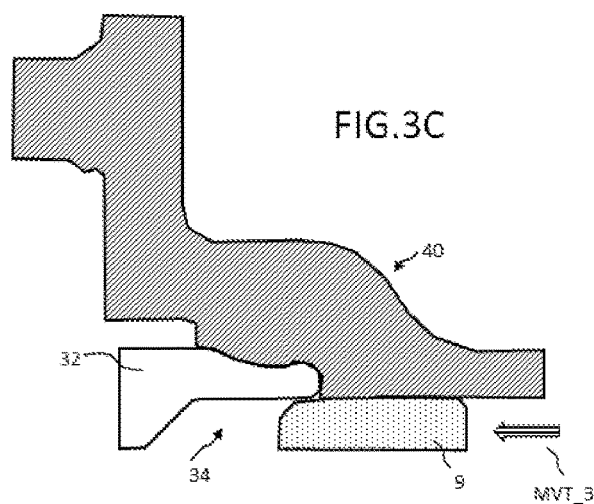
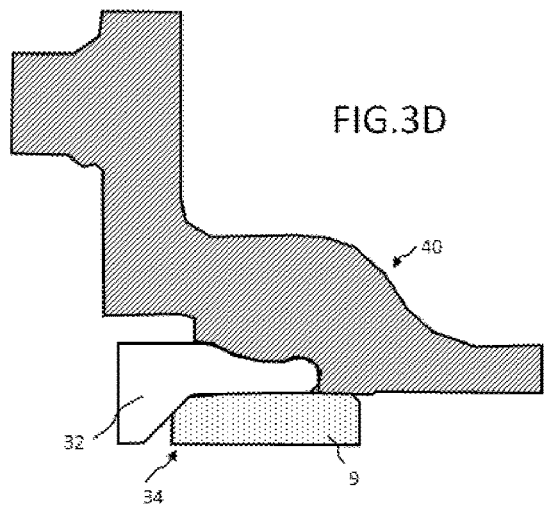

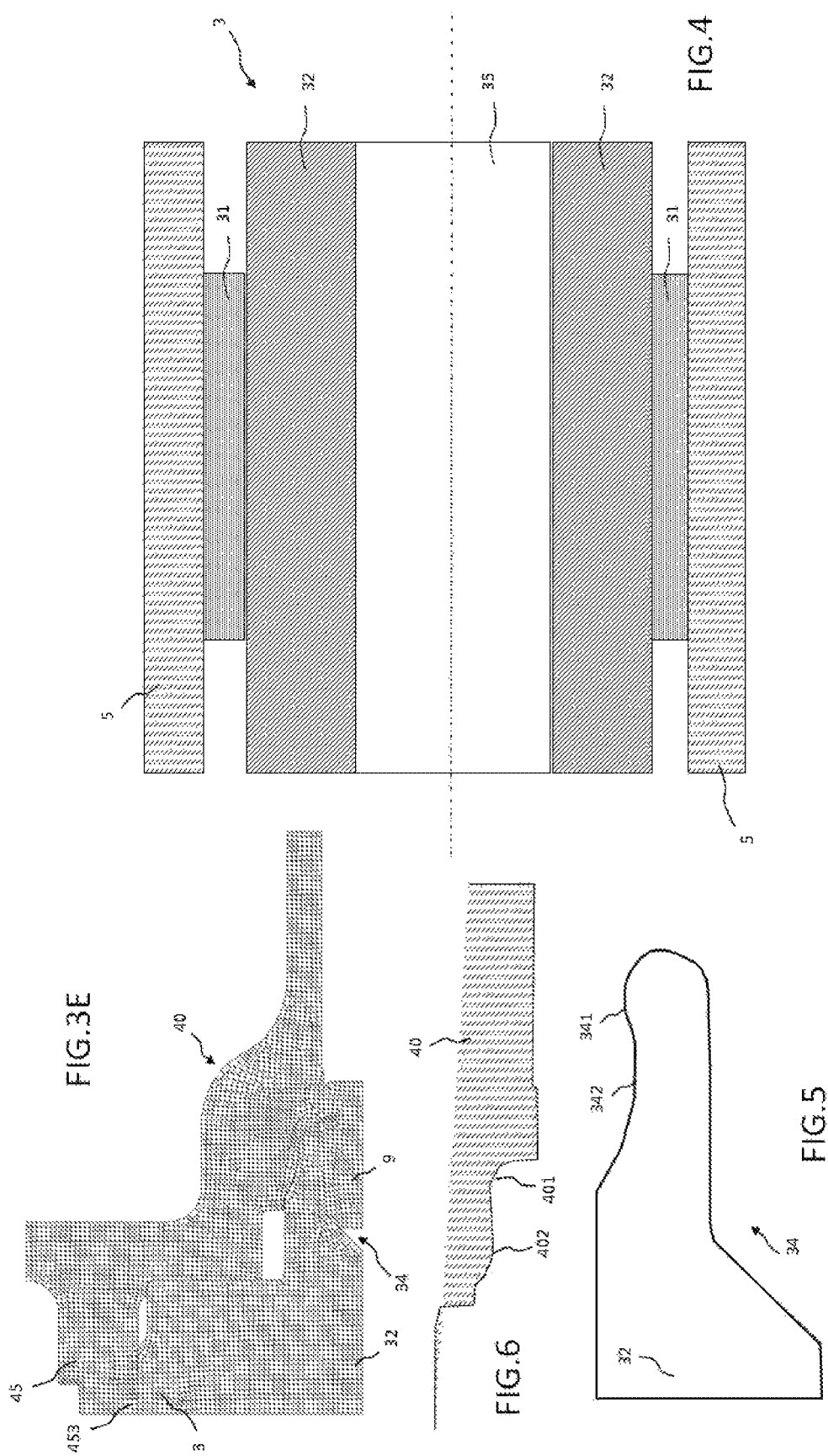

JUNCTION BODY, FITTINGS, HYDRAULIC SYSTEM FOR THE PASSAGE OF A FLUID BETWEEN TWO HYDRAULIC CIRCUITS, ASSOCIATED MOUNTING PROCESS

CROSS REFERENCE TO RELATED APPLICATIONS

This application is the U.S. National Stage of PCT/EP2017/078570, filed Nov. 8, 2017, which in turn claims priority to French Patent Application No. 1660838 filed Nov. 9, 2016, the entire contents of all applications are incorporated herein by reference in their entireties.

FIELD

The field of the invention relates to hydraulic systems and more specifically to hydraulic fittings and junction bodies for joining two hydraulic circuits. The field of the invention is more precisely that of leak tight junction bodies and fittings to enable the routing of a first fluid in an environment in which a second fluid is present without the fluids being in contact. The field of the invention notably pertains to hydraulic junction bodies and fittings for aircraft having to ensure a certain mechanical stress, ensure a given leak tightness and dissipate or conduct a current generated by lightning or by electrostatic charges. Finally, the field of the invention also concerns methods for mounting such a hydraulic system for aircraft.

PRIOR ART

In the aeronautics field, there exists a need to convey a fluid such as fuel or hydraulic oil in tanks themselves comprising a liquid of same nature or of different nature. This is notably the case when a hydraulic fluid is used to transmit power, for example when the landing gear of an aircraft comes down, and when said fluid is conveyed by a pipe that passes through a kerosene tank.

In order to fulfil such a function, the hydraulic systems have to ensure a certain leak tightness to avoid leakages of a fluid from one hydraulic circuit to another hydraulic circuit.

One solution is to implement hydraulic pipes, fittings and junction bodies made of metal to withstand the mechanical and thermal stresses. However, this solution does not make it possible to ensure a defined electrical resistance because, by construction, metal fittings are conductive.

Recently, new solutions have appeared to reinforce the leak tightness between two parts of a hydraulic circuit or two hydraulic circuits. For example, such a solution is described in the patent application FR 2 947 609 in which a junction body is mounted between two fittings of a hydraulic circuit. The central body is made of polymer in order to be electrically insulating. To this end, the central body is mounted on pipe junction interfaces, otherwise called fittings, of a hydraulic circuit by an operation of radial crimping which requires specific tooling.

Furthermore, on account of the nature and the function of a central body, it concentrates a large part of the mechanical stresses resulting from load transfers from the metal parts of the hydraulic circuit pressing on the latter. Moreover, the central body 3 must satisfy particularly important electrical, thermal and chemical requirements on account of the functions that it exerts in its environment. A consequence is to bring about supplementary stresses at the fitting ends of the central body which can reduce the lifetime of the piece or favour the appearance of leakages over time.

Furthermore, the electrical charges coming from lightning flowing in the metal parts, thus including in the pipes, can dissipate through the different components and lead to a risk of inflammation at the level of the fuel tanks.

The mixed solutions deployed employing components made of metal and made of polymer must thus offer sufficient resistivity to absorb a certain electrical power in order to avoid any risk of inflammation.

SUMMARY OF THE INVENTION

The invention makes it possible to overcome the aforesaid drawbacks.

According to one aspect, the invention relates to a central body for hydraulic system for fluid comprising a frame comprising a first tubular end for connecting an upstream hydraulic circuit comprising a first fitting and a second tubular end for connecting a downstream hydraulic circuit comprising a second fitting, said central body comprising a passage passing through the frame to convey the fluid coming from the upstream hydraulic circuit to the downstream hydraulic circuit, said frame being made of an electrically insulating material, the central body comprising a printed conductive circuit in order to conduct a part of the electrical charges flowing between the upstream hydraulic circuit and the downstream hydraulic circuit.

According to an embodiment, the frame is a polymer.

According to an embodiment, the conductive circuit is printed on the outer surface of the frame.

According to an embodiment, the central body comprises an electrically insulating annular substrate fixed on the outer surface of the frame on which is printed the conductive circuit.

According to an embodiment, the substrate is a ceramic.

According to an embodiment, the conductive circuit is made from a resistive ink.

According to an embodiment, the resistance is comprised in the following range [10 kOhm; 100 MOhm], According to an embodiment, the resistance is comprised in the following range [100 kOhm; 100 MOhm], According to an embodiment, at least the first and/or the second tubular end comprises two different diameters so as to create on the outer surface of the tubular end in a sectional plane including the axis of revolution of the tubular end a flared profile.

According to another aspect, the invention relates to a hydraulic pipe system comprising:
  a central body of the invention;
  an upstream hydraulic circuit comprising a first fitting comprising an annular connection portion extending over the outer periphery of an upstream portion of the frame substantially up to the substrate;
  a downstream hydraulic circuit comprising a second fitting comprising an annular connection portion extending over the outer periphery of a downstream portion of the frame substantially up to the substrate;
  a first electrically conductive annular seal forming the junction between the annular connection portion of the first fitting of the upstream hydraulic circuit and the substrate of the central body;
  a second electrically conductive annular seal forming the junction between the annular connection portion of the second fitting of the downstream hydraulic circuit and the substrate of the central body.

According to an embodiment, the system of the invention comprises a tubular junction element forming a spacer laid out between the inner diameter of a tubular end of the frame and a fitting of a hydraulic circuit.

According to an embodiment, the system comprises a peripheral protective cover covering the outer surface of the substrate or the frame and the annular connection portions of the fittings.

According to an embodiment, at least one fitting comprises:
- a first threading laid out on the inner surface of the annular connection portion in such a way as to screw said fitting onto the outer surface of the central body and/or;
- a second threading laid out on the outer surface of the outer annular connection portion in such a way as to screw the cover onto said outer surface.

According to another aspect the invention relates to a method for mounting a hydraulic system of the invention which comprises an assembly of a central body and a fitting. The assembly comprises:
- an insertion of a tubular end of the central body into an inner diameter of a fitting of a hydraulic circuit having a portion forming an inner annular groove;
- a displacement of a tubular junction element having an outer diameter corresponding substantially to the inner diameter of the tubular end of the central body, said displacement aiming to forcibly insert the tubular junction element inside the tubular end of the central body.

According to an embodiment, the assembly further includes:
A preliminary step of positioning the tubular junction element in a tubular opening of the fitting of a hydraulic circuit, said tubular junction element comprising at least one translational degree of freedom in said tubular opening of the fitting of the hydraulic circuit.

According to an embodiment, the tubular junction element is a spacer forming an element for maintaining the tubular end of the frame.

According to an embodiment, the method for mounting a hydraulic system of the invention includes:
- an assembly of a central body and a fitting;
- the mounting of a first conductive seal arranged on the outer surface of the frame of the central body and being in contact with the end of the annular connection portion of the fitting and laid out in its extension;
- the mounting of an annular substrate, if need be, arranged on the outer surface of the frame of the central body and being in contact with the first conductive seal and laid out in its extension;
- the mounting of a second conductive seal arranged on the outer surface of the frame of the central body and being in contact with the annular substrate when it is mounted and laid out in its extension;
- the mounting of a second fitting laid out to cover a part of the frame of the central body and to insert the tubular end of the frame into the inner circumference of said fitting comprising a maintaining groove.

According to an embodiment of the invention, a spacer is tightly mounted in the second tubular end of the frame, said spacer being inserted through the tubular opening of the second fitting.

According to an embodiment of the invention, a tube of the upstream or downstream hydraulic circuit is fitted in a fitting of the upstream or downstream hydraulic circuit.

BRIEF DESCRIPTION OF THE FIGURES

Other characteristics and advantages of the invention will become clear from reading the detailed description that follows, with reference to the appended figures, which illustrate:

FIG. 1: a sectional view of a hydraulic system of an embodiment of the invention comprising a central body of the invention;

FIG. 2: a perspective view of a system of the invention of FIG. 1;

FIGS. 3A to 3E: the main mounting steps of an embodiment of a method of the invention;

FIG. 4: a sectional view of the frame of a central body of an embodiment of the invention;

FIG. 5: an embodiment of a tubular end of a central body of the invention;

FIG. 6: a portion of a fitting of a hydraulic circuit cooperating with a central body of the invention.

DESCRIPTION

FIG. 1 represents a sectional view of a central body 3 of the invention. In the remainder of the description a "central body" or a "junction body" will equally well designate the body that forms the junction between two hydraulic circuits through junction interfaces also called "fittings".

The central body 3 of FIG. 1 makes it possible to connect on the one hand a part of an upstream hydraulic circuit 2 to a part of a downstream hydraulic circuit 4. The two parts 2, 4 may be understood as two hydraulic circuits 2 and 4 connected by the central body 3 and junction interfaces 20 and 40, otherwise called fittings 20 and 40.

The central body 3 comprises a frame 32 made of electrically insulating material. According to an embodiment, the frame 32 is made of polymer. The frame 32 comprises a passage, for example tubular 35, making it possible to convey a fluid coming from an upstream hydraulic circuit 2 to a downstream hydraulic circuit 4 or vice versa. According to an embodiment, the frame 32 has a cylindrical shape comprising two tubular ends 33 and 34 each cooperating with a fitting 20 or 40 of a hydraulic circuit 1.

According to an embodiment, the hydraulic circuits 2, 4 are metal and may comprise a surface treatment. The central body 3 thus makes it possible to ensure a leak tight junction between the two metal hydraulic circuits 2, 4.

Fittings

The fittings 20, 40 each include a pipe interface and a frame interface in order to ensure the passage of a fluid from the frame 32 of the central body 3 to a pipe 41 of a hydraulic circuit 4 (the upstream tube of the fitting 20 is not represented).

The pipe interface of the fitting 20, 40 comprises a part forming a tubular mouth 21, 43 for connecting a metal tube 41. Different types of fittings 20, 40 exist depending on the design of the pipe interface. In FIG. 1, only the fitting 40 of the downstream hydraulic circuit 4 comprises a tube 41 fitted into the tubular mouth 43. Thus the "mouth of the fitting" denotes the part receiving a pipe such as a mechanical tube 41. The invention also applies to pipes having an oval section or any other shape enabling the routing of a liquid.

Moreover, the fittings 20, 40 each comprise an extension 25, 45 of larger diameter than that of the pipe 41. This extension 25, 45 includes a cylindrical portion that extends over a part of the outer surface of the frame 32, as is represented in FIG. 1 with the portions 25 and 45. These portions are called "annular connection portion" or extension of the fitting.

A first fitting 20 comprises a tubular mouth comprising different diameters 21, 22, 23. Such a design makes it possible to integrate a cylindrical maintaining piece 9 in the cavity 23 which will next be tightened into the tubular end 33 of the central body 3. Other uses of such a design may be made and are not detailed in the present description.

The second fitting 40 comprises a mouth of constant or substantially constant inner diameter in which a spacer 9 is tightly fitted.

The fittings 20, 40 each include a frame interface cooperating with the tubular ends 33, 34 of the frame 32 of the central body 3. The frame interface notably includes the inner tubular surfaces of a fitting making it possible to receive the tubular ends 33, 34 of the frame 32.

FIG. 3 represents the part of the frame interface receiving the tubular end 34. This part notably comprises a first inner diameter 401 larger than an inner diameter 402 in such a way as to form a slight groove. This groove makes it possible to exert a maintaining force on the frame 32 when it is inserted into the fitting 40. The insertion of the tubular end 34 of the frame 32 is carried out forcibly. The polymer material of the frame allows a slight deformation to introduce the tubular end 34 into the housing 402, 401 of the fitting 40. The deformation taking place with a return to the initial shape once the frame 32 has been inserted.

A system of the invention comprising a central body 3 of the invention as well as the fittings 20, 40 may comprise different types of fittings depending on the connectivity offered with the tubular pipes. According to other alternative embodiments, the system of the invention may comprise two junction interfaces of the interface 20 type on either side of the ends of the central body 3 or instead two junction interfaces of interface 40 type on either side of the central body 3. The fittings 20, 40 may thus differ on either side of the central body 3 or may be identical.

According to an embodiment, an O-ring seal 10 is laid out on the periphery of the circumference of the tubular end 33, 34 of the frame. The O-ring seal 10 is in contact with an inner surface of the fitting 20, 40.

The hydraulic system of the invention further comprises at least one tubular junction element 9 forming a spacer making it possible to press a tubular end 33 or 34 of the frame 32 against the inner walls of a fitting 20 or 40.

A first level of leak tightness is ensured by the presence of the spacer ensuring a contact under mechanical pressure of the end 33 or 34 on a wall of the fitting.

A second level of leak tightness is ensured by the presence of the O-ring seal 10.

Frame of the central body According to an embodiment, the frame 32 has symmetry of design between its downstream part and its upstream part with regard to a median plane orthogonal to the axis of the pipe. This symmetry notably enables a facilitated mounting independently of its orientation.

According to an embodiment, the frame 32 comprises at least one revolutionary irregularity on its outer surface.

According to an alternative, the irregularity forms a groove for the placement of a leak tightness seal between the frame 32 and a fitting 20, 40.

According to another alternative, the surface irregularity forms an annular outgrowth in such a way as to create an integrated seal intended to be inserted into a groove of a frame interface of a fitting 20, 40.

Case of a Fitting with Substrate

FIG. 4 represents a central body 3 comprising a frame 32 having at its centre a through opening 35 forming a passage for the circulation of a fluid. A substrate 31 is laid out on the outer circumference of the frame 32 which makes it possible to dissociate the mechanical function from the electrical function of the central body 3. The cover 5 is also represented in this figure.

The cover 5 also makes it possible to limit the impact of shocks on the pieces of the hydraulic system of which notably the central body 3 or the extensions 25, 45 of the fittings.

According to an embodiment, the central body 3 comprises an annular part 31 forming a substrate. The substrate 31 is, for example, a ceramic. According to an embodiment, an electrically conductive circuit having a predefined resistivity is printed on the substrate. The printed circuit is produced on the substrate in such a way as to establish an electrical connection between the first fitting 20 and the second fitting 40.

According to an embodiment, electrically conductive seals 26, 46 are laid out on the one hand between the first fitting 20 and the substrate 31 and on the other hand between the second fitting 40 and the substrate 31.

According to an embodiment, the seals are annular and suited to cooperating with the fittings 20, 40 and the substrate 31.

According to an embodiment, the electrical circuit is designed to conduct a part of the current propagating in the metal parts. According to an embodiment, the electrical circuit comprises a resistivity making it possible to dissipate a part of the electrical power.

According to an embodiment, an annular cover 5 covers the substrate 31 as well as the electrical circuit printed on the substrate 31. The cover 5 advantageously covers the annular connection portions 25 and 45 extending over the outer surface of the frame 32. According to an embodiment, the outer surface of the annular connection portions 25, 45 of the fittings 20, 40 include grooves 27, 47 for the passage of leak tightness seals.

According to an embodiment, the cover 5 is screwed onto at least one fitting 20, 40 which includes an outer threading.

Case of a central body without substrate According to an alternative embodiment, the electrical circuit is printed directly on the polymer frame 32.

According to a first embodiment, the frame 32 comprises a portion of larger diameter in a central part of the frame 32. This part may, for example, occupy the circumferential space occupied by the substrate 31 of FIG. 1. This embodiment makes it possible to design a printed circuit electrically joining a first conductive seal 26 to a second electrically conductive seal 46.

According to a second embodiment, the frame 32 does not include a part of larger diameter at the centre. An annular insulating seal separates the two annular connection portions 25 and 45 of the fittings 20 and 40 extending substantially up to a median plane separating the frame 32 perpendicular to its axis. The electrically insulating seal avoids charges being directly transmitted from one fitting to the other. In this embodiment, the frame 32 includes a printed circuit comprising a connection with the first fitting 20 at the level of its extension 25 and another connection with the extension 45 of the second fitting 40. Such a circuit may be produced on the outer surface of the polymer so as to be in circumferential electrical contact with the two fittings 20 and 40.

According to another embodiment, the two fittings 20, 40 may be in electrical contact directly by means of a conductive seal. This embodiment does not require a printed electrical circuit but does not make it possible to ensure a dimensioning of dissipated power beyond a certain emitted current threshold. This embodiment is not represented in the figures.

According to another embodiment, a conductive seal of an intermediate diameter may be arranged in part on a portion of the outer surface of the frame 32. In this embodiment, each annular connection portion 25 or 45 of the fittings 20, 40 is laid out on a part of the outer surface of the conductive seal. This embodiment is not represented in the figures.

Electrical Dimensioning

According to an embodiment, the printed electrical circuit comprises controlled electrical properties. It is conductive and comprises a resistivity causing a certain dissipation of the electrical energy of the circulating current. The design and the lay out of the electrical circuit on the surface of the central body 3 or of the substrate 31 makes it possible to anticipate an operating mode making it possible to protect the system of the invention against electrostatic charges and lightning currents. Thus, a printed electrical circuit having controlled electrical properties is a printed electrical circuit having a resistance in a predefined range.

In all the embodiments, the electrical circuit of a central body 3 of the invention comprises a resistance making it possible to:
 dissipate a certain power in the event of lightning currents and;
 dissipate currents induced by static electricity which can arise from friction of the fluid with the components of the hydraulic circuits.

The resistance of the printed circuit must thus be comprised between a maximum value of 100 MOhm and a minimum value of 10 kOhm, and preferentially a minimum value of 100 kOhm.

According to an embodiment, the printed circuit may also ensure inductive and/or capacitive functions.

According to an embodiment, a conductor or semiconductor element is used so as to establish electrical connectivity between the two metal fittings in replacement of the printed circuit.

Functional Separability

An advantage of this design is to separate the functions ensuring the mechanical strength and the leak tightness of the central body 3 and its electrical function making it possible to ensure protection with regard to the propagation of lightning currents. The design of the central body 3 ensures a functional separability of the central body 3 by a structural architecture dissociating these different functional constraints. Such an architecture has an advantage during the detection of electrical breakdowns, mechanical deteriorations or leaks. Moreover, this architecture enables a facilitated maintenance of a hydraulic system of the invention and of a central body 3 of the invention.

Mounting Method

The invention also relates to a mounting method making it possible to ensure the mechanical strength of the pieces between each other and sufficient leak tightness to guarantee partitioning of the liquids from each other. To this end, the invention makes it possible, through the introduction of a spacer, to ensure mechanical strength and to guarantee leak tightness of the central body 3 once mounted.

FIGS. 3A to 3D present the steps of the method for mounting a central body 3 of the invention on fittings 20, 40 of hydraulic circuits which have to be connected. The mounting method is particularly advantageous in that it makes it possible to eliminate the crimping step which could be damaging for the pieces. In order to avoid mounting by crimping, according to an embodiment of the invention, the hydraulic system 1 of the invention includes a tubular junction element 9 forming a spacer between a tubular end 33, 34 of the frame 32 and the fitting 20, 40 and the pipe of the hydraulic circuit to connect.

Step 3A is an optional step carried out prior to steps 3B to 3D of the method of the invention in a particular case of design of the pipe interface of the fitting 20.

Indeed, the pipe interface of the fitting 20 has different parts 21, 22, 23 each having its own inner diameter. To be specific, FIG. 1 represents a narrowing of the diameter on the portion 22 opposite a tubular portion 21 able to receive a pipe. This design includes in the extension of the part 22 an increase in the diameter of a part 23 emerging opposite the tubular end 33 of the frame 32. In such a design, it is then necessary to lay out the spacer 9 via the pipe interface due to the narrowing 22. In such a situation, step 3A is necessary in order to position the spacer 9 in the cylindrical cavity 23 before positioning the frame 32 inside the fitting 20. During this first step, the spacer 9, which is translationally free, is released according to a movement MVT1 in the cavity 23 in order to enable the tubular end 33 of the frame 32 to be integrated in the annular cavity 402, 401. Such an annular cavity is represented in FIG. 6, by symmetry the annular cavity 402, 401 of the fitting 40 is identical to that of the first fitting 20.

The pipe interface 43 of the fitting 40 does not include a difference in inner diameter. Consequently, step 3A is not necessary in this situation. The spacer may be inserted via the pipe interface until penetrating into the tubular end 34 of the frame 32 when the latter is inserted into the fitting 40. The preliminary step of FIG. 3A is thus carried out in an optional manner depending on the design of the fitting 20, 40.

The following steps of the method of the invention, which are represented in FIGS. 3B, 3C and 3D, are carried out in all cases of mounting of a central body 3 of the invention.

The steps of the methods that follow are described in relation with the tubular end 34 but are just as valid for the tubular end 33.

The mounting method of the invention thus includes a step 3B during which the frame 32 is forcibly mounted on a fitting 40. Alternatively, the mounting of a fitting 20, 40 is carried out by screwing onto the central body 3. In the latter case, the central body 3 comprises a threading on its outer surface. The fittings 20, 40 also comprise a threading enabling screwing onto the central body 3.

The tubular end 34 is thus inserted according to a movement comprising at least one translation MVT 2 in the cylindrical cavity of the fitting 40 having a slight groove 401 making it possible to maintain the frame 32. During this insertion, the tubular end 34 of the frame 32 is slightly deformed.

A step of positioning the spacer 9 is next carried out. This step is represented in FIG. 3C in which the movement MVT 3 represents a translation of the spacer 9 in the inner diameter of the tubular end 34 of the frame 32. The driving in of the spacer 9 may be realised from a tool making it possible to deploy the necessary force to insert the spacer 9.

FIG. 3D represents a finalised positioning of the spacer 9 which is on the one hand in support of the frame 32 due to the fact that the spacer is partially inserted into the tubular end 34 and in support of the fitting 40 due to the fact that it is also partially in contact with the inner diameter of the latter.

One advantage of the invention is not to generate deformation of the introduced pipe 41 on account of the crimping of the pieces. The invention makes it possible to dimension a mechanical piece defining a tubular junction element 9, having a spacer function, which can withstand mechanical stresses. The role of this piece makes it possible to avoid any deformation of the tube of a pipe generated by the mounting of the pieces.

FIG. 3E represents a view of FIG. 3D in which the tubular end 32 of the frame 3 is positioned in the fitting 40. The spacer 9 is tightly fitted inside the tubular portion of the end 32. In this figure may also be perceived the circumferential contact 453 between the outer surface of the frame 3 and the inner surface of the annular connection portion 45. According to an embodiment, the part 453 is a threading making it possible to screw a fitting 45 onto the outer surface of the frame 3.

An advantage of a central body 3 of the invention is to be able to be used for hydraulic circuit applications routing a fluid at high pressure notably up to 350 bars/5080 psi. These performances may be obtained on account of the good mechanical, thermal and chemical properties and the leak tightness obtained by such a central body 3 mounted on a metal hydraulic circuit.

According to one aspect, the invention relates to a method for mounting a hydraulic system 1 comprising the assembly of a tubular end 33, 34 in a fitting 20, 40 such as described previously.

Considering the exemplary case of FIG. 1, the mounting method is described starting from the left of the figure, that is to say from the fitting 20.

Firstly, if need be, an O-ring seal 10 and a counter seal may be arranged in the frame interface of the fitting 20 to ensure leak tightness of the hydraulic system 1 of the invention.

Next, the tubular junction element 9 is inserted into a tubular opening of the fitting 20, notably into the cavity 23 of the fitting 20. The tubular junction element 9 is translationally free in the cavity 23.

Then, the tubular end 33 of the central body 3 is inserted into an inner diameter of the fitting 20 notably in contact with the parts 402, 403. According to an embodiment, this insertion is carried out forcibly so as to make the part 341 penetrate into the inner annular groove 401. According to an alternative or complementary embodiment, the frame 32 is screwed inside the portion 25 of the fitting 20. In this latter case, the portions of the frame 32 and the portion of the fitting 25 which are facing each include a threading making it possible to screw the pieces together. The screwing may be carried out "forcibly" in so far as the mechanical screwing force must be sufficient to allow a slight deformation of the tubular end 9 in order to insert the end thereof into the groove and thus to insert totally the tubular end 33 into the fitting 20.

Once the tubular end 33 completely inserted in the fitting 20, the tubular junction element 9 is inserted into the tubular part of the end 33. According to an embodiment, the inner diameter of the tubular end 33 is slightly less than the inner diameter of the cavity 23. In this way, the tubular element 9 is forcibly inserted into the tubular end 33. This configuration makes it possible to ensure better maintaining of the pieces together, moreover it makes it possible to ensure better leak tightness.

According to an embodiment, the cavity 23 includes a portion 230 comprising a reduction in the inner diameter in such a way as to maintain the tubular junction element 9 and to reinforce the leak tightness of the hydraulic system 1.

In order to insert the junction element 9 forcibly into the portion 230 and into the tubular end 33, a tool may be used, the latter penetrating through the opening 22 of the fitting 20 and being able to be handled from the exterior.

The mounting method next includes the introduction of a first conductive seal 26 arranged on the outer surface of the frame 32 of the central body 3 and being in contact with the end of the annular connection portion 25 of the fitting 20 and laid out in its extension.

Then, an annular substrate 31 is arranged on the outer surface of the frame 32 of the central body 3. When the electrical circuit is directly printed on the body, the step of insertion of the substrate is not carried out.

The first conductive seal 26 is thus laid out between the fitting 25 and the substrate 31.

A second conductive seal 46 is next arranged on the outer surface of the frame 32 of the central body 3 and being in contact with the annular substrate 31 when it is mounted and laid out in its extension.

A second fitting 40 is laid out to cover a part of the frame 32 of the central body 3 and to insert the tubular end 34 of the frame 32 into the inner circumference of said fitting comprising a maintaining groove 401. The second fitting 40 may be screwed onto the frame 32 as previously the fitting 20 onto the frame 32.

A cover 5, for example of polymer type, may be screwed onto the outer surface of the portions 25, 45 of the fittings 20, 40. According to an embodiment, the threadings are formed in such a way that the screwing of the cover 5 may be done in the opposite sense to the direction of screwing of at least one fitting on the frame 32. This solution makes it possible to have available a self-blocking function. The screwing of the cover 5 thus enables better maintaining of the fittings 20, 40 on the frame 32.

According to an embodiment, the fitting 40 includes a circumferential notch on its outer surface so as to clip the cover 5. In this case, the downstream end of the cover 5 is thus inserted into the circumferential notch and ensures an anti-dismounting function.

The spacer 9 is inserted into the fitting 40 via its central opening. It is noted that the design of the fitting 40 differs from the fitting 20 notably by the central opening which does not comprise two cavities 21, 23 separated by an intermediate cavity having a smaller diameter. The spacer 9 is thus inserted via the pipe interface of the fitting 40 up to a frame interface.

The frame interface of the fitting 40 includes a reduction, for example progressive, of the inner diameter of its passage in such a way as to tightly fit the spacer 9.

Finally, a tube 41 of the downstream hydraulic circuit 4 is fitted into a fitting 40. The tube 41 may be, for example, crimped in the pipe end 43 of the fitting 40.

As an example, the crimping may be carried out by means of a ring 42 deformed by a tool (not represented) in order to maintain the tube 41 in the fitting 40.

The invention claimed is:

1. Hydraulic pipe system comprising:
  a central body comprising:
    a frame comprising a first tubular end for connecting an upstream hydraulic circuit comprising a first fitting and a second tubular end for connecting a downstream hydraulic circuit comprising a second fitting,
    an annular electrically insulating substrate that is fixed on an outer surface of the frame
    a passage passing through the frame to convey the fluid coming from the upstream hydraulic circuit to the downstream hydraulic circuit, said frame, being of cylindrical shape made of an electrically insulating material,
a conductive printed circuit having a predefined resistivity and printed on said annular electrically insulating substrate,
said conductive printed circuit having controlled electrical properties in order to conduct a part of the electrical charges flowing between the upstream hydraulic circuit and the downstream hydraulic circuit;
said upstream hydraulic circuit comprising said first fitting comprising an annular connection portion extending over an outer periphery of an upstream portion of the frame substantially up to the substrate;
said downstream hydraulic circuit comprising said second fitting comprising an annular connection portion extending over an outer periphery of a downstream portion of the frame substantially up to the substrate;
a first electrically conductive annular seal forming the junction between the annular connection portion of the first fitting of the upstream hydraulic circuit and the substrate of the central body, and
a second electrically conductive annular seal forming the junction between the annular connection portion of the second fitting of the downstream hydraulic circuit and the substrate of the central body.

2. The hydraulic pipe system according to claim 1, wherein the frame is a polymer.

3. The hydraulic pipe system according to claim 1, wherein the annular electrically insulating substrate is a ceramic.

4. The hydraulic pipe system according to claim 1, wherein the conductive printed circuit is made from a resistive ink.

5. The hydraulic pipe system according to claim 4, wherein a resistance of the resistive ink is comprised in the following range [10 kOhm; 100 MOhm].

6. The hydraulic pipe system according to claim 5, wherein the resistance is comprised in the following range [100 kOhm; 100 MOhm].

7. The hydraulic pipe system according to claim 1, wherein at least the first and/or the second tubular end comprises two different diameters so as to create on the outer surface of the tubular end in a sectional plane including the axis of revolution of the tubular end a flared profile.

8. The hydraulic pipe system according to claim 1, further comprising a spacer laid out between an inner diameter of one of the tubular ends of the frame and one of the first and second fittings of one of the upstream and downstream hydraulic circuits.

9. The hydraulic pipe system according to claim 1, further comprising a peripheral protective cover covering an outer surface of the substrate or the frame and the annular connection portions of the first and second fittings.

10. The hydraulic pipe system according to claim 9, wherein at least one of the first and second fitting comprises:
a first threading laid out on the inner surface of the annular connection portion in such a way as to screw said fitting onto the outer surface of the central body and/or;
a second threading laid out on the outer surface of the outer annular connection portion in such a way as to screw the cover onto said outer surface.

11. Method of mounting the hydraulic pipe system according to claim 1, comprising carrying out an assembly of the central body and at least one fitting of the first and second fittings, said assembly comprising:
an insertion of the tubular end of the central body into an inner diameter of the at least one fitting of the hydraulic circuit having a portion forming an annular inner groove;
a displacement of a tubular junction element having an outer diameter corresponding substantially to the inner diameter of the tubular end of the central body, said displacement aiming to forcibly insert the tubular junction element inside the tubular end of the central body.

12. The method of mounting the hydraulic pipe system according to claim 11, wherein the assembly further includes:
a preliminary step of positioning the tubular junction element in a tubular opening of the at least one fitting of the hydraulic circuit, said tubular junction element comprising at least one translational degree of freedom in said tubular opening of the at least one fitting of the hydraulic circuit.

13. The method of mounting the hydraulic pipe system according to claim 11, wherein the tubular junction element is a spacer forming an element for maintaining the tubular end of the frame of the central body.

14. The method of mounting the hydraulic pipe system according to claim 11 comprising:
assembling the central body and the at least one fitting;
mounting the first seal arranged on the outer surface of the frame of the central body and being in contact with the end of the annular connection portion of the at least one fitting and laid out in its extension;
mounting the second conductive seal arranged on the outer surface of the frame of the central body and being in contact with the annular substrate when it is mounted and laid out in its extension;
mounting the second fitting laid out to cover a part of the frame of the central body and to insert the tubular end of the frame into the inner circumference of said at least one fitting comprising the annular inner groove.

15. The method of mounting the hydraulic pipe system according to claim 14, wherein:
a spacer is tightly mounted in the second tubular end of the frame, said spacer being inserted through the tubular opening of the second fitting;
a tube of the upstream or downstream hydraulic circuit is fitted in the at least one fitting of the upstream or downstream hydraulic circuit.

16. The method of mounting a hydraulic pipe system according to claim 14, further comprising mounting the annular substrate, arranged on the outer surface of the frame of the central body and being in contact with the first conductive seal and laid out in its extension.

* * * * *